Inventor
JESSE C. WELCH
WM. F. ALTENBAUGH

By Richard J. Cook
Attorney

J. C. WELCH AND W. F. ALTENBAUGH.
VEHICLE WHEEL.
APPLICATION FILED APR. 27, 1920.
1,406,122.
Patented Feb. 7, 1922.
2 SHEETS—SHEET 2.
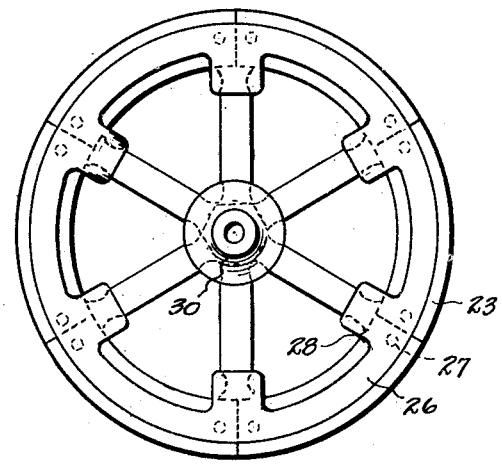
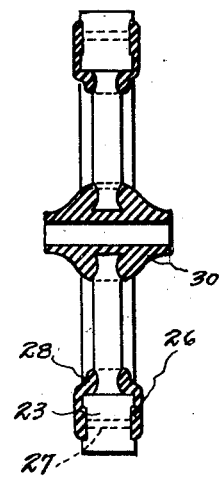
Inventor
JESSE C. WELCH
WM. F. ALTENBAUGH
By Richard J. Cook
Attorney

UNITED STATES PATENT OFFICE.

JESSE C. WELCH, OF TACOMA, AND WILLIAM FRANCIS ALTENBAUGH, OF YEOMAN, WASHINGTON; SAID ALTENBAUGH ASSIGNOR TO SAID WELCH.

VEHICLE WHEEL.

1,406,122.     Specification of Letters Patent.     Patented Feb. 7, 1922.

Application filed April 27, 1920. Serial No. 376,903.

*To all whom it may concern:*

Be it known that we, JESSE C. WELCH and WILLIAM FRANCIS ALTENBAUGH, citizens of the United States, and residents of Tacoma, Pierce County, Washington, and Yeoman, Pierce County, Washington, respectively, have invented certain new and useful Improvements in Vehicle Wheels, of which the following is a specification.

This invention relates to improvements in vehicle wheels, and more particularly to wheels for toy vehicles, wherein it is desired to provide strength and lightness of construction at a relatively small cost; the principal object of the invention being to provide for the casting of hubs, spokes and reinforcing bands on wheel bodies of wood, or other light, durable and somewhat resilient material, in such a manner that such bodies will be sufficiently strengthened to serve the purpose for which they are desired, and may be properly mounted.

It is also an object of the invention to provide wheels of this character wherein the wheel bodies are constructed of a plurality of sections which are joined rigidly by the casting of peripheral metallic bands on their opposite faces that are joined together by ties that extend between the bands and are cast integral therewith.

A still further object of the invention is to provide means whereby the felloe sections and spokes of wheels of the ordinary type may be secured functionally together by means of hubs cast about the inner ends of the spokes, and by lugs cast about outer ends of the spokes and adjacent ends of the felloe sections.

Another object of the invention is to adapt the above method of reinforcing to wheels of a particular construction wherein the several sections of a band or ring that is revoluble upon a central body are joined functionally by a track and tire cast and joined according to the present invention.

In accomplishing these and other objects of the invention, we have provided the improved details of structure, the preferred forms of which are illustrated in the accompanying drawings, wherein—

Figure 7 is a side view of a wheel wherein the spokes and felloes are joined by castings and bands about their opposite faces, and at their inner ends the spokes have a hub cast thereon.

Figure 8 is a vertical section of the wheel shown in Figure 7.

Figure 1:
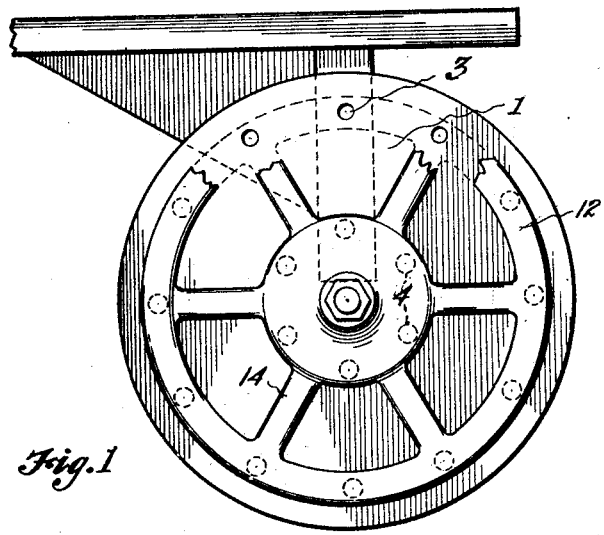
Figure 1 is a side view of a vehicle wheel constructed according to the present invention, showing a hub, spokes and peripheral band cast thereon.

Referring more in detail to the several figures of the drawings, wherein like reference characters designate like parts; 1 designates a circular wheel body, preferably wood, or other light, substantial and somewhat resilient material, provided at its center with an opening 2, about its periphery with a circular row of apertures 3, and intermediate the row of apertures 3 and center opening 2 with a circular row of apertures 4.

Cast within the body of the wheel and extending through the opening 2, is a metallic hub 5 which may, if desired, have extended bearing portions 6 at opposite sides of the body and has a bore 7 concentric with the axial line of the body for receiving an axle or spindle 8. Cast integrally with the hub to overlie opposite sides of the body, are flanges 9 and 10, which are joined by metal ties 11 which extend through the apertures 4 and are integral with the flanges.

Arranged concentrically about the hub, on opposite faces of the body, are two reinforcing bands 12 which follow the line of apertures 3 and are joined together by ties 13 which extend between the bands through these apertures. Spokes 14 may also be cast integrally with the hub and bands to additionally stiffen the body.

Figure 3:
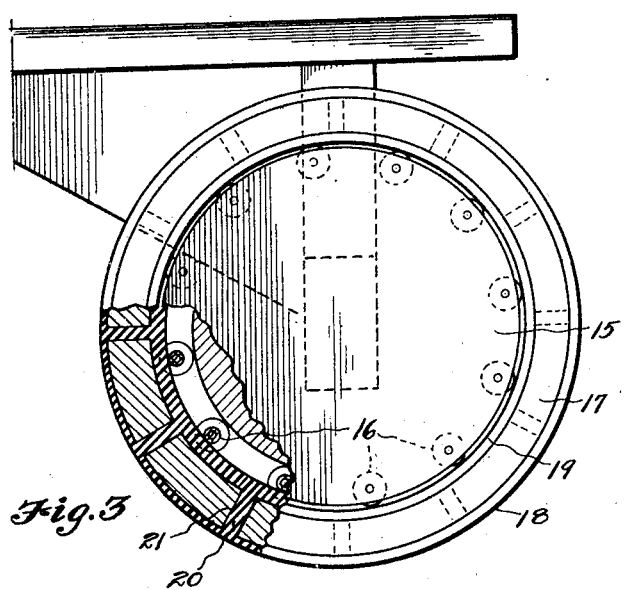
Figure 3 is a side view of wheel of a different type, consisting of a stationary center portion and a revolving rim having a tire and roller bearing track cast thereon and joined together in accordance with the present invention.
Figure 4:
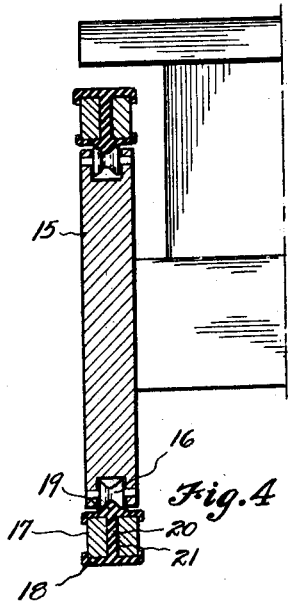
Figure 4 is a central, vertical section of the wheel shown in Figure 3.

In Figures 3 and 4 we have illustrated a wheel of a particular type of construction, wherein a circular, central body portion 15 is equipped with a plurality of rollers 16, mounted equidistant from a central point, and upon which a ring-like rim 17 is adapted to revolve. On the outer surface of this rim 17 we have cast a tire or band, 18, and on the inner side a track cooperates with the rollers to mount the rim upon the body 15.

In this latter construction, the rim 17 may comprise several sections and the tire 18 and track 19 are cast similarly, as are the bands 12 of the wheel in Figure 1, and are joined together by means of ties 20 which extend through radially directed apertures 21 in the rim sections. Such a construction will not only strengthen the rim but also will retain its sections in proper relation.

Figure 5:
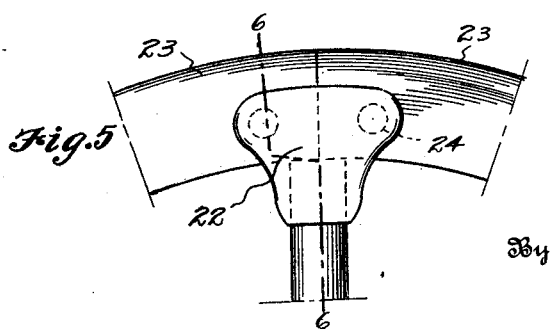
Figure 5 is a side view of two felloe sections and a spoke of a wheel joined together, according to the present invention.
Figure 6:
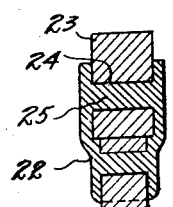
Figure 6 is a sectional view on the line 6—6 of Figure 5.

Figures 5 and 6 illustrate the joining of two felloe sections and the spoke of a wheel by means of a casting 22 that is formed about the parts to be joined. In this, the ends of the felloe sections 23 are provided with apertures 24, and the metal when poured about the parts to form the lug runs through these apertures, forming ties 25, which, being a part of the casting will prevent the parts being separated.

Wheels of the usual type, comprising a plurality of felloe sections, and spokes, may be joined as shown by Figures 7 and 8, wherein the several felloe sections are joined by means of bands 26, cast on their opposite faces and joined by transverse ties 27, as previously described, and the spokes are joined to the felloes by castings 28 formed as is shown in Figure 5, or cast integral with the bands. A hub 30 may be cast centrally of the wheel about the inner ends of all the spokes.

Figure 2:
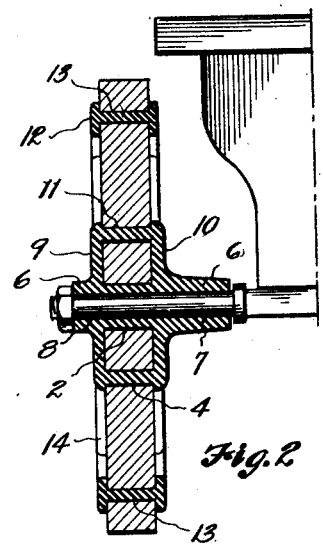
Figure 2 is a vertical section of the same.

In making wheels of the character disclosed in Figures 1 and 2, a mold is first provided, wherein the wooden body may be placed. The metal for the hub and peripheral bands is then poured into the mold so that all parts will be simultaneously and integrally cast. By using the proper metal, the hub and bands thus cast will quickly cool and no damage will be done to the body.

The other type of wheels illustrated are also formed after the rim sections and spokes are properly arranged in suitable molds which will mold the cast metal hub and lugs, as described.

It is apparent that by this method of construction a wooden body, or a plurality of body sections, may be substantially strengthened to withstand heavy pressure, and a hub with an extended bearing surface provided. It is also noted that with the hubs flanged on both sides of the body and bands also provided on both sides of the body, which are joined by the integrally cast ties, the body is greatly strengthened against lateral strain and a wooden wheel of a plurality, or of a single piece, with the grain of the wood all in the same direction, may be made practically unbreakable.

What we claim as new, is:

1. A vehicle wheel comprising a circular body portion having a central opening and a plurality of apertures spaced from the central opening, and a hub cast within the central opening and having flanges formed integrally therewith overlying opposite faces of the body and joined by integrally cast ties extending through said apertures.

2. A vehicle wheel comprising a circular wooden body having a central opening and a circular row of apertures concentric with the body, a hub cast within the central opening and extending at opposite sides of the body to form an extended spindle bearing; said hub having flanges cast integrally therewith to overlie opposite faces of the body and to extend beyond the row of apertures and joined by integrally cast ties extending through said apertures.

3. In a vehicle wheel, a circular body portion having a circular row of apertures therethrough adjacent its periphery, and annular bands cast on opposite faces of the body and joined by integrally cast ties extending through said body apertures.

4. A vehicle wheel comprising a circular body portion having a central opening and a circular row of apertures adjacent its periphery, a hub cast within the central opening and extending on opposite sides of the body, annular reinforcing bands cast on opposite faces of the body and joined by ties cast integrally therewith and extending through the said apertures and a plurality of spokes cast integrally with the hub and bands and extending along opposite faces of the body.

Signed at Tacoma, Pierce County, Washington, this 16th day of April, 1920.

JESSE C. WELCH.
WILLIAM FRANCIS ALTENBAUGH.